United States Patent
Hong et al.

(10) Patent No.: US 7,710,719 B2
(45) Date of Patent: May 4, 2010

(54) MOBILE HARD DISK BOX

(75) Inventors: Lin-Yun Hong, Shenzhen (CN);
Hsuan-Chen Chen, Tu-Cheng (TW);
Chien-Li Tsai, Tu-Cheng (TW);
Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 756 days.

(21) Appl. No.: 11/309,861

(22) Filed: Oct. 16, 2006

(65) Prior Publication Data

US 2007/0187267 A1 Aug. 16, 2007

(30) Foreign Application Priority Data

Dec. 14, 2005 (CN) .................... 2005 2 0120551 U

(51) Int. Cl.
*G06F 1/16* (2006.01)
(52) U.S. Cl. ............................... 361/679.35; 360/244.3; 248/633; 364/708.1
(58) Field of Classification Search ............... 360/244.3; 439/638; 248/618, 633; 361/679.26, 679.27, 361/679.3, 679.33, 679.35; 364/708.1
See application file for complete search history.

(56) References Cited

U.S. PATENT DOCUMENTS

| | | | | |
|---|---|---|---|---|
| 6,891,723 | B1 * | 5/2005 | Lin et al. | 361/679.33 |
| 7,489,505 | B2 * | 2/2009 | Hong et al. | 361/679.35 |
| 2009/0046419 | A1 * | 2/2009 | Drake et al. | 361/685 |

FOREIGN PATENT DOCUMENTS

TW M271233 7/2005

* cited by examiner

*Primary Examiner*—Hung V Duong
(74) *Attorney, Agent, or Firm*—Wei Te Chung

(57) ABSTRACT

A hard disk box includes a tray, a cover, and a enclosure. The tray includes a bezel and a bottom plate. The bottom plate includes a locking portion forming a catch. The cover includes a rear wall, and an insert wall extending from a side of the rear wall. A hook extends from the rear wall for engaging the catch of the tray. The enclosure accommodates the bottom plate of the tray and the insert wall of the cover, and is retained between the bezel of the tray and the rear wall of the cover. The enclosure defines an opening in a bottom wall thereof, corresponding to the locking portion of the tray.

19 Claims, 6 Drawing Sheets

MOBILE HARD DISK BOX

FIELD OF THE INVENTION

The present invention relates to mobile hard disk boxes, and particularly to a mobile hard disk box which readily allows installation or removal of a hard disk thereto or therefrom.

DESCRIPTION OF RELATED ART

In modern life, a mass of data needs to be transmitted between two electronic devices, such as computers or other data controlling devices. A mobile hard disk is generally used for completing the task. The hard disk is accommodated in a box to prevent the hard disk from being damaged. A typical mobile hard disk box includes several parts assembled by screws.

As shown in FIGS. 5 and 6, a mobile hard disk box is disclosed. The hard disk box includes a tray 920, a cover 960, and an enclosure 950. A hard disk 980 is received in the hard disk box. The tray 920 includes a bezel 922, and a bottom plate 924. Four through-holes 926 and a mounting hole 928 are defined in the bottom plate 924. The cover 960 includes insert walls 962 extending forward from sides thereof. A fixing tab 964 extends forward from the cover 960. A through hole 966 is defined in the fixing tab 964 corresponding to the mounting hole 928 of the tray 920. The enclosure 950 defines a round hole in a bottom wall thereof, corresponding to the through hole 966 of the cover 960 and the fixing hole 928 of the tray 920. The hard disk 980 forms four mounting tabs on a bottom wall thereof. Each mounting tab defines a threaded hole (not shown) therein. In assembling, four screws 970 are inserted through the corresponding through-holes 926 of the tray 920 and engage in the corresponding threaded holes of the hard disk 980. Thus, the hard disk 980 is mounted to the tray 920. The bottom plate 924 of the tray 920 with the hard disk 980 is accommodated in the enclosure 950. The insert wall 962 and the fixing tab 964 are inserted into the enclosure 950. A screw 930 is inserted through the round hole of the enclosure 950 and the through hole 966 of the cover 960, and engages in the mounting hole 928 of the tray 920. Thus, the cover 960 is mounted to the tray 920. However, this way of installing the hard disk 980 uses so many screws, which is unduly painstaking and time-consuming.

What is desired, therefore, is a mobile hard disk box which readily allows easy installation or removal of a hard disk thereto or therefrom.

SUMMARY OF THE INVENTION

An exemplary hard disk box includes a tray, a cover, and an enclosure. The tray includes a bezel and a bottom plate. The bottom plate includes a locking portion forming a catch. The cover includes a rear wall, and an insert wall extending from a side of the rear wall. A hook extends from the rear wall for engaging the catch of the tray. The enclosure accommodates the bottom plate of the tray and the insert wall of the cover, and is retained between the bezel of the tray and the rear wall of the cover. The enclosure defines an opening in a bottom wall thereof, corresponding to the locking portion of the tray.

Other advantages and novel features will become more apparent from the following detailed description when taken in conjunction with the accompanying drawings, in which:

DETAILED DESCRIPTION OF THE INVENTION

Figure 1:
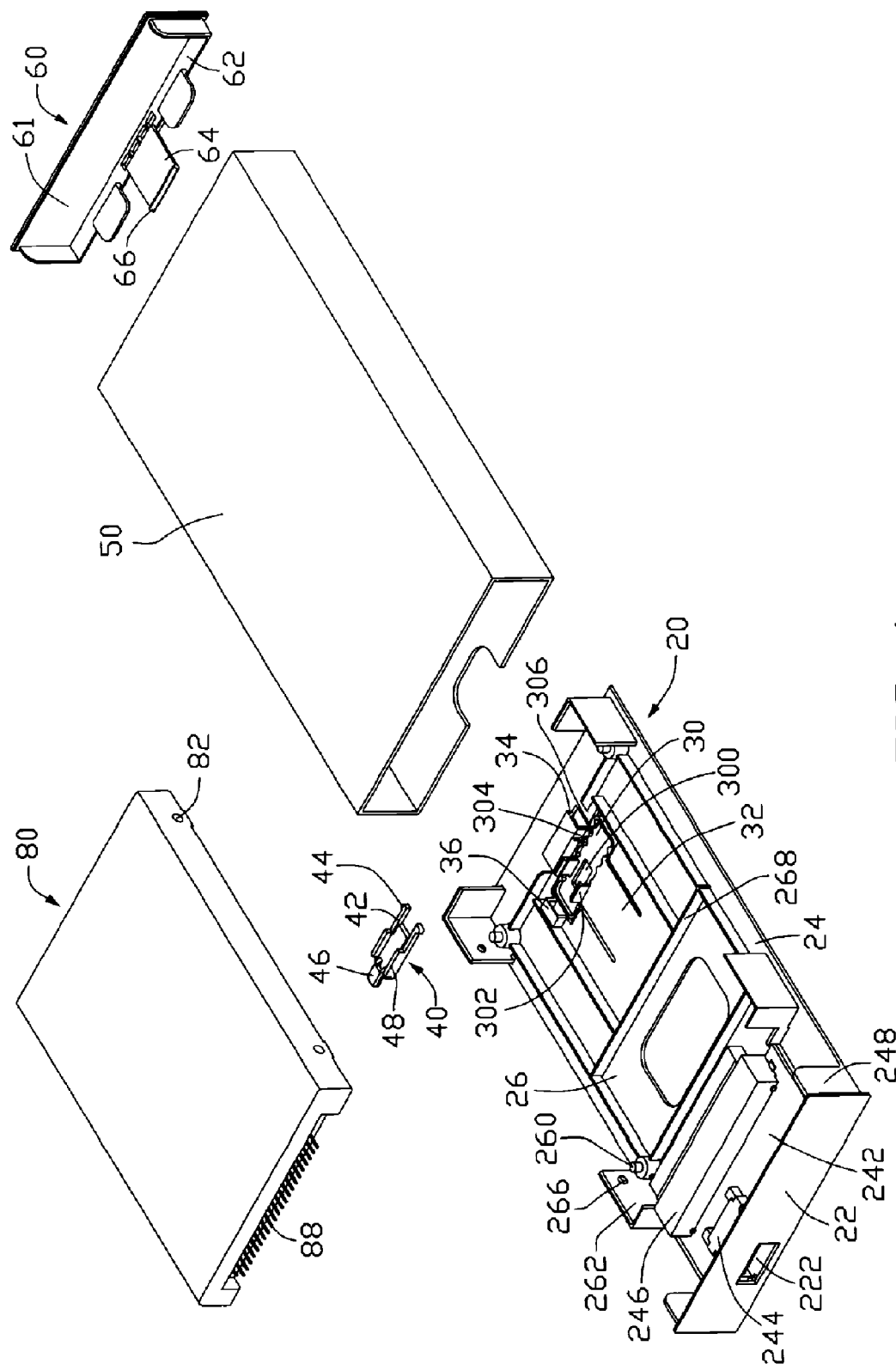
FIG. 1 is an exploded, isometric view of a mobile hard disk box in accordance with a preferred embodiment of the present invention, together with a hard disk.
Figure 2:
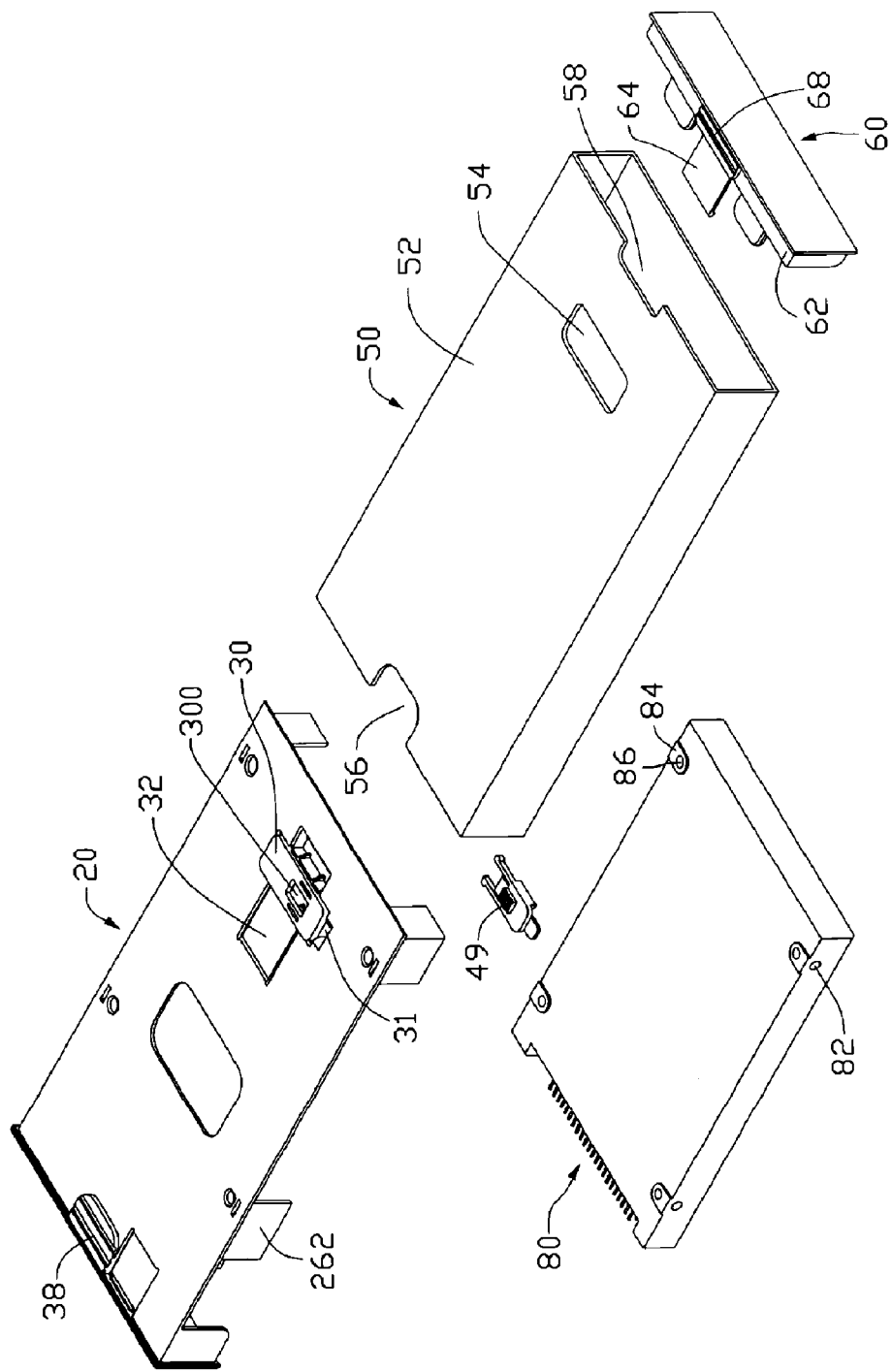
FIG. 2 is an inverted view of FIG. 1.

Referring to FIGS. 1 and 2, a mobile hard disk box in accordance with a preferred embodiment of the present invention includes a tray 20, an operating member 40, an enclosure 50, and a cover 60. The hard disk box is used for receiving a hard disk 80. The hard disk 80 defines two receiving holes 82 in each side wall thereof. Four mounting tabs 84 are formed on four corners of a bottom wall of the hard disk 80. Each mounting tab 84 defines a through hole 86 therein. The hard disk includes a male connector 88 at an end thereof.

The tray 20 includes a bezel 22, and a bottom plate 24 perpendicularly extending from a bottom of the bezel 22. A slot 222 is defined in the bezel 22 to provide an access for an external connector passing therethrough. A motherboard 242 is mounted on the bottom plate 24 adjacent the bezel 22. The motherboard 242 includes a connector 244 aligning with the slot 222 for connecting with the external connector, and a female connector 246 configured for connecting to the male connector 88 of the hard disk 80. Two insert walls 248 connecting with corresponding ends of the bezel 22 perpendicularly extend up from corresponding sides of the bottom plate 24. Four L-shaped retainers 262 perpendicularly extend from the bottom plate 24. The retainers 262 are arranged on four corners of a rectangle respectively and facing each other. A protrusion 266 protrudes from an internal side of each retainer 262. Four positioning posts 260 extend up from the bottom plate 24, adjacent the corresponding retainers 262. A plurality of supporting ribs 268 is formed on the bottom plate 24, for supporting the hard disk 80. A locking portion 30 is received in and exposed from an opening 31 defined in a rear end of the bottom plate 24. A resilient connecting arm 32 extends from the bottom plate 24, for connecting the locking portion 30 and the bottom plate 24. The locking portion 30 defines a groove 300 therein. Two claws 302 extend up from opposite sides of the locking portion 30. Each side of the locking portion 30 defines a first notch 304 and a second notch 306 in an inner surface thereof. A catch 34 extends from one of the sides of the locking portion 30. A receiving portion 36 is formed on the bottom plate 24, adjacent an end of the opening 31. A pulling portion 38 is formed on an outer surface of the bottom plate 24, adjacent the bezel 22.

The operating member 40 includes a pair of resilient rods 42 extending from an end thereof. Each rod 42 forms a latch 44 on a free end thereof. A block 46 protrudes from an opposite end of the operating member 40, corresponding to the receiving portion 36 of the tray 20. Two projecting portions 48 extend up from two opposite sides of the operating member 40 respectively. An operating section 49 is formed on an outer surface of the operating member 40, corresponding to the groove 300 of the bottom plate 24. A length of the operating section 49 is shorter than that of the groove 300.

The enclosure 50 has a bottom wall 52, a top wall opposite to the bottom wall 52, and two side walls connecting corresponding ends of the bottom wall 52 and the top wall. The bottom wall 52, the top wall, and the side walls together define a receiving space. An opening 54 is defined in the bottom wall 52, for receiving the locking portion 30 of the tray 20. A first cutout 56 and a second cutout 58 are defined in opposite ends of the bottom wall 52. The first cutout 56 corresponds to the pulling portion 38 of the tray 20.

The cover 60 includes a rear wall 61 and insert walls 62 extending forward from corresponding sides of the rear wall 61. A resilient arm 64 extends forward from a middle of a bottom of the rear wall 61. A hook 66 is formed on a free end of the resilient arm 64, corresponding to the catch 34 of the tray 20. An operating portion 68 is formed on an outer surface of the insert wall 62, corresponding to the second cutout 58 of the enclosure 50.

Figure 3:
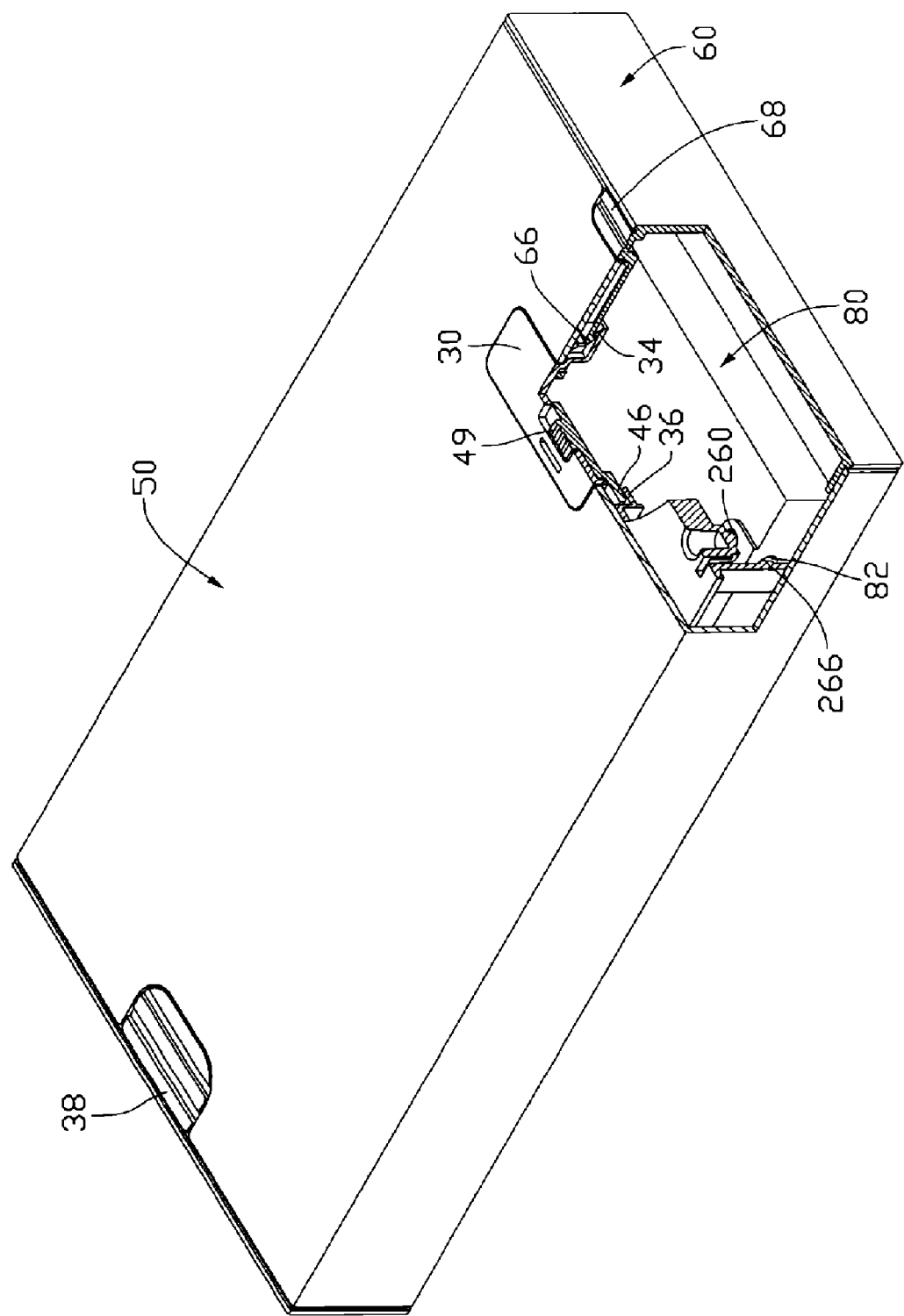
FIG. 3 is an assembled view of FIG. 2, but partially cutaway, and showing the hard disk box in a locked state.
Figure 4:
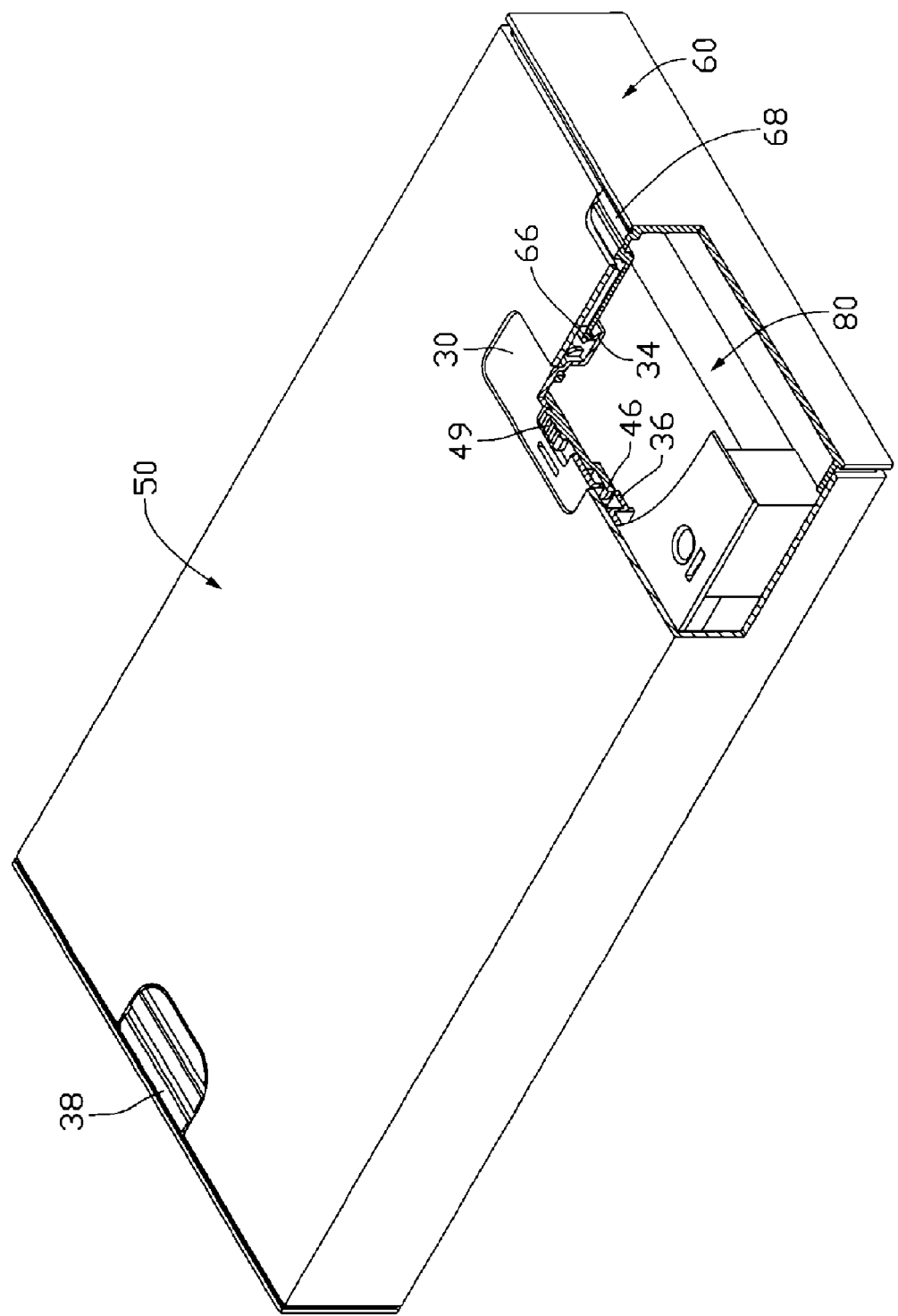
FIG. 4 is similar to FIG. 3, but showing the hard disk box in an unlocked state.
Figure 5:
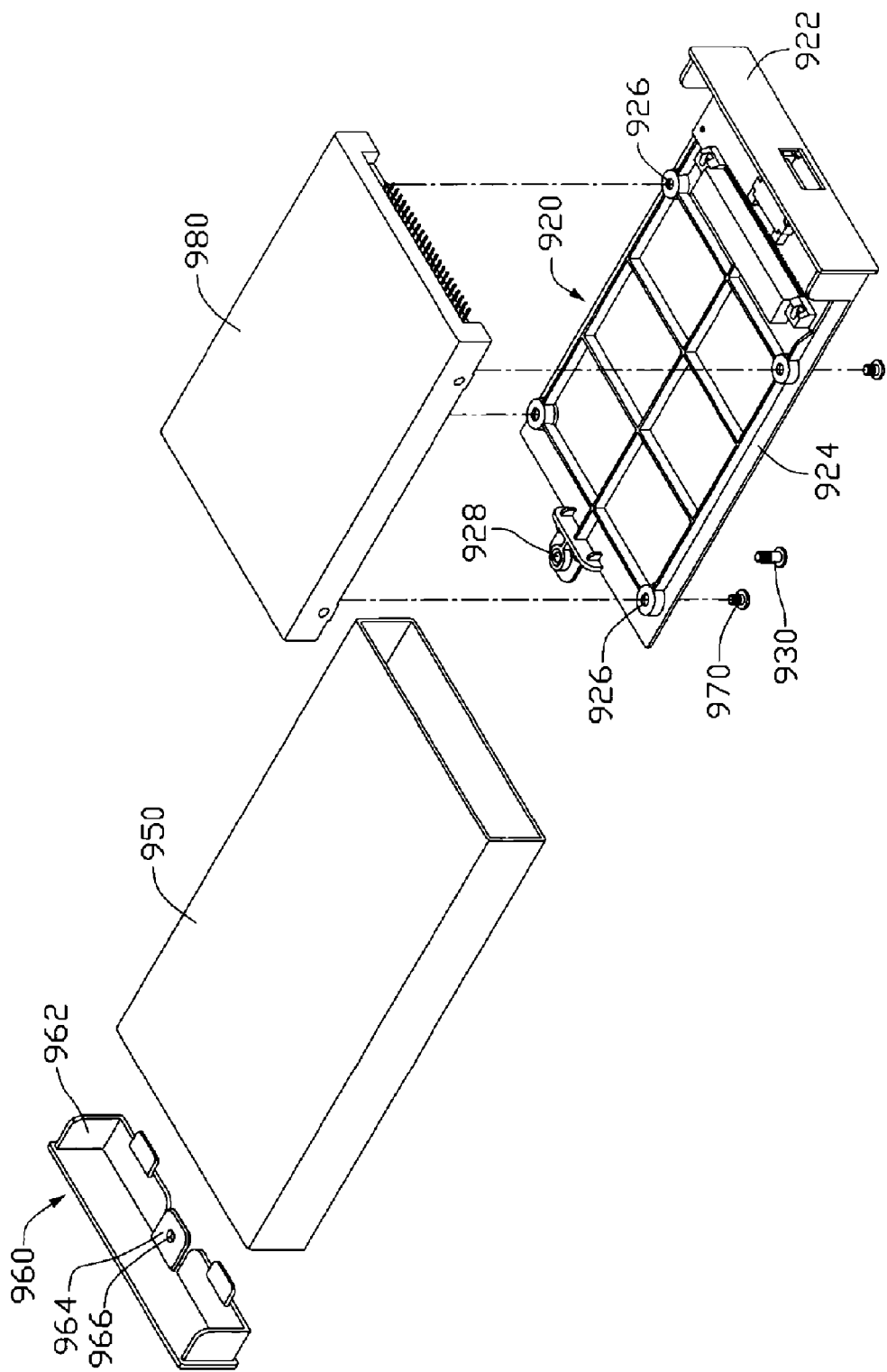
FIG. 5 is an exploded, isometric view of a conventional hard disk box with a hard disk.
Figure 6:
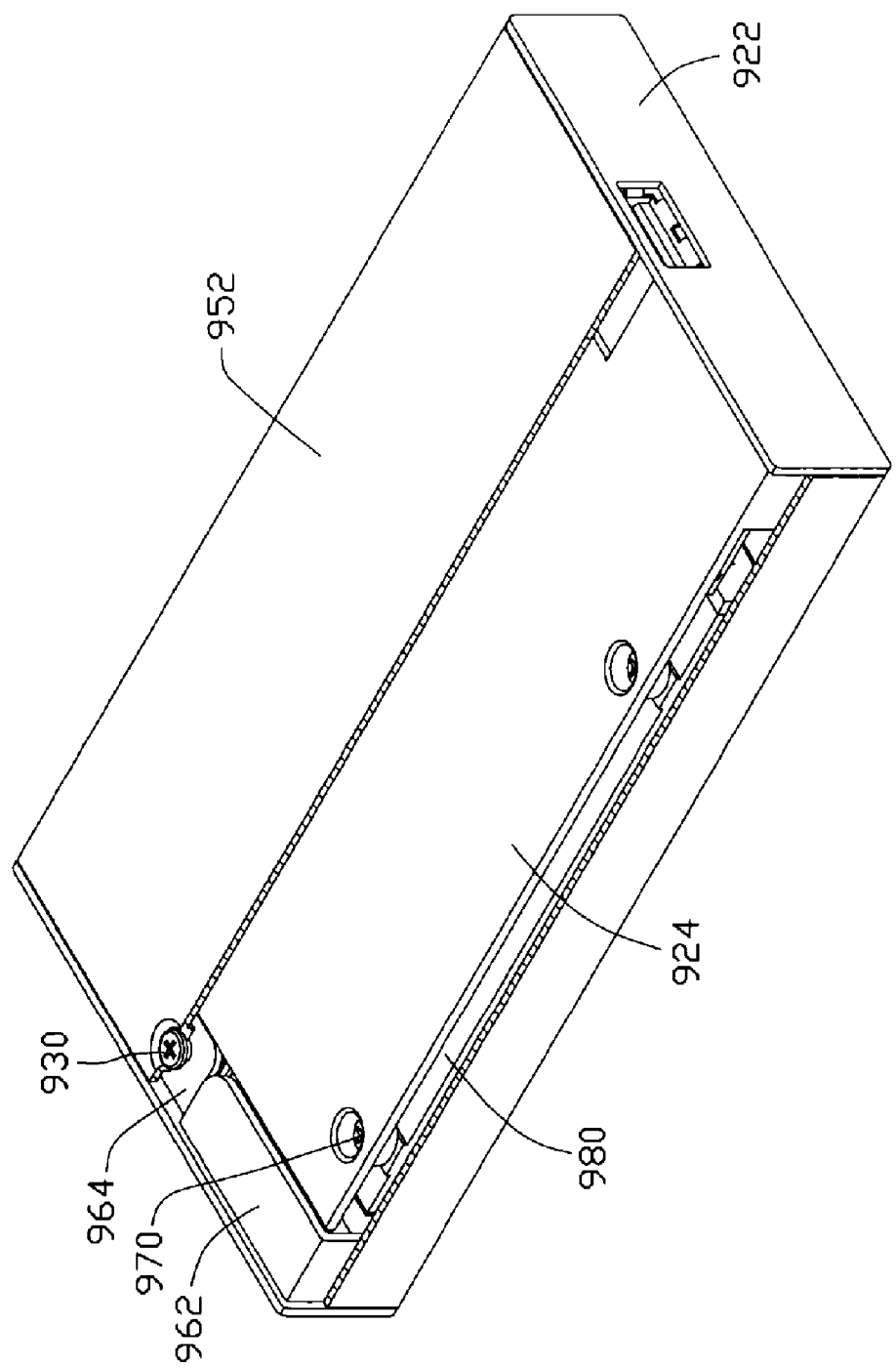
FIG. 6 is an assembled view of FIG. 5, but partially cutaway.

Referring to FIGS. 3 and 4, in assembling the hard disk box and the hard disk 80, the projecting portions 48 of the operating member 40 are received by the claws 302 of the locking portion 30 of the tray 20. The latches 44 of the operating member 40 are received in the corresponding second notches 306. The operating section 49 of the operating member 40 is received in the groove 300 of the locking portion 30. Thus, the operating member 40 is slidably assembled to the locking portion 30 of the tray 20, in an unlocked position. The hard disk 80 is then received in a space formed by the retainers 262 of the tray 20. The male connector 88 of the hard disk 80 is connected to the female connector 246 of the motherboard 242. The supporting ribs 268 of the tray 20 support the hard disk 80. The positioning posts 260 of the tray 20 are inserted into the corresponding through holes 86 of the hard disk 80. The retainers 262 abut against the corresponding side walls of the hard disk 80. The protrusions 266 of the retainers 262 are received in the corresponding receiving holes 82 of the hard disk 80. Thus, the hard disk 80 is mounted to the tray 20. The bottom plate 24 of the tray 20 with the hard disk 80 is accommodated in the enclosure 50. The bezel 22 abuts against an end of the enclosure 50. The pulling portion 38 of the tray 20 is received in the first cutout 56 of the enclosure 50. The locking portion 30 of the tray 20 is received in the opening 54 of the enclosure 50. The insert wall 62 of the cover 60 is inserted into the enclosure 50, and the rear wall 61 of the cover 60 abuts against an opposite end of the enclosure 50. The hook 66 of the cover 60 catches the catch 34 of the locking portion 30. Thus, the cover 60 is secured to the tray 20. The enclosure 50 is retained between the bezel 22 of the tray 20 and the rear wall 61 of the cover 60. The operating portion 68 of the cover 60 is received in the second cutout 58 of the enclosure 50. The operating section 49 is pushed to slide the operating member 40. The block 46 is received in the receiving portion 36 of the tray 20. The latches 44 are received in the corresponding first notches 304. Thus, the operating member 40 is in a locked position, and the locking portion 30 is kept locked, and cannot be pressed to release the catch 34 from the hook 66 of the cover 60.

In opening the hard disk box, the operating section 49 is pushed to slide the operating member 40 to the unlocked position. The block 46 of the operating member 40 is withdrawn from the receiving portion 36 of the tray 20. The latches 44 are received in the corresponding second notches 306. The locking portion 30 is pressed, and the hook 66 of the cover 60 is released from the catch 34 of the locking portion 30. The operating portion 68 is pulled to withdraw the cover 60 from the enclosure 50. The pulling portion 38 is pulled to withdraw the tray 20 from the enclosure 50. When the hard disk 80 is drawn upward, the retainers 262 are distorted, and the protrusions 266 are disengaged from the receiving holes 82 of the hard disk 80. The positioning posts 260 are withdrawn from the through holes 86. Thus, the hard disk 80 is disassembled from the tray 20.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiment of the invention.

What is claimed is:

1. A hard disk box comprising:
   a tray comprising a bezel and a bottom plate, the bottom plate comprising a locking portion resiliently connecting thereto, the locking portion forming a catch;
   a cover comprising a rear wall and an insert wall extending from a side of the rear wall, a hook extending from the rear wall for engaging with the catch of the tray; and
   an enclosure accommodating the bottom plate of the tray and the insert wall of the cover, and retained between the bezel of the tray and the rear wall of the cover, the enclosure defining an opening in a bottom wall thereof, corresponding to the locking portion of the tray.

2. The hard disk box as claimed in claim 1, wherein the bottom plate of the tray defines an opening corresponding to the opening of the enclosure for receiving the locking portion thereof, and a resilient connecting arm extends from the bottom plate for connecting the locking portion to the bottom plate.

3. The hard disk box as claimed in claim 2, further comprising an operating member slidably assembled on the locking portion of the tray, for keeping the locking portion locked.

4. The hard disk box as claimed in claim 3, wherein the operating member forms a block on an end thereof, the bottom plate of the tray forms a receiving portion adjacent the opening of the bottom plate of the tray, the block is received in the receiving portion when the operating member is in a locked position.

5. The hard disk box as claimed in claim 4, wherein the operating member comprises a pair of latches extending from an opposite end thereof, the locking portion of the tray forms two pairs of notches, for selectively receiving the latches to keep the operating member in the locked position or an unlocked position.

6. The hard disk box as claimed in claim 3, wherein the locking portion forms two claws extending up therefrom, the operating portion forms two projection portions extending up therefrom, the claws catch the corresponding projection portions of the operating member.

7. The hard disk box as claimed in claim 3, wherein the locking portion of the tray defines a groove therein, the operating member forms an operating portion received in the groove of the locking portion.

8. The hard disk box as claimed in claim 1, wherein the tray further comprises a pulling portion forming on an end of the bottom plate adjacent the bezel thereof, the enclosure defines a cutout for receiving the pulling portion.

9. The hard disk box as claimed in claim 1, wherein the cover further comprises an operating portion formed on the insert wall thereof, the enclosure defines a cutout for receiving the operating portion.

10. A hard disk assembly, comprising:
    a hard disk;
    a tray comprising a bezel and a bottom plate, the bottom plate receiving and supporting the hard disk, the bottom plate comprising a catch;
    a cover comprising a rear wall, and a hook extending from the rear wall for engaging with the catch of the tray; and
    an enclosure accommodating the bottom plate of the tray, and retained between the bezel of the tray and the rear wall of the cover, the enclosure defining an opening in a bottom wall thereof, for providing an access to release the catch of the tray from the hook of the cover.

11. The hard disk assembly as claimed in claim 10, wherein the bottom plate forms a locking portion, the catch is formed on the locking portion, a resilient connecting arm extends from the bottom plate of the tray to connect the locking portion to the bottom plate, an opening is defined in the bottom plate corresponding to the opening of the enclosure for receiving the locking portion.

12. The hard disk assembly as claimed in claim 11, further comprising an operating member slidably assembled on the locking portion of the tray, for keeping the locking portion locked.

13. The hard disk assembly as claimed in claim 12, wherein the operating member forms a block on an end thereof, the bottom plate of the tray forms a receiving portion adjacent the opening of the bottom plate of the tray, the block is received in the receiving portion when the operating member is in a locked position.

14. The hard disk assembly as claimed in claim 13, wherein the operating member comprises a pair of latches extending from an opposite end thereof, the locking portion of the tray forms two pairs of notches, for selectively receiving the latches to keep the operating member in the locked position or an unlocked position.

15. The hard disk assembly as claimed in claim 12, wherein the locking portion forms two claws extending up therefrom, the operating portion forms two projection portions extending up therefrom, the claws catch the corresponding projection portions of the operating member.

16. The hard disk assembly as claimed in claim 12, wherein the locking portion of the tray defines a groove therein, the operating member forms an operating portion received in the groove of the locking portion.

17. A hard disk box comprising:
  an enclosure along a first axis including a pair of enclosure ends with a receiving space formed between the enclosure ends, an enclosure wall formed between the enclosure ends, the enclosure wall having an opening defined therein;
  a tray movably received in the receiving space along the first axis, the tray being configured for mounting a hard disk thereon, and including a resilient tray locking portion positioned so as to be accessible from the opening, the tray locking portion being configured to be deformable inward upon being pressed; and
  a cover mounted at one of the enclosure ends, and including a cover locking portion extending toward the tray, wherein the cover locking portion engages with the tray locking portion to lock the tray in the receiving space when the tray locking portion is in a normal state, and disengages from the tray locking portion when the tray locking portion is in a deformed state.

18. The hard disk box of claim 17, further comprising an operating member movably attached to an inside of the enclosure wall at the tray locking portion, wherein the operating member is movable between a locked position where the operating member abuts against the tray locking portion in a manner so as to prevent inward deformation of the tray locking portion, and an unlocked position allowing inward deformation of the tray locking portion.

19. The hard disk box of claim 18, wherein moving direction of the operating member is perpendicular to the first axis.

* * * * *